(12) United States Patent
Fuller et al.

(10) Patent No.: US 11,353,140 B2
(45) Date of Patent: Jun. 7, 2022

(54) TWO PORT MEMS SILICON FLOW CONTROL VALVE

(71) Applicant: DunAn Microstaq, Inc., Austin, TX (US)

(72) Inventors: E. Nelson Fuller, Manchester, MI (US); Parthiban Arunasalam, Austin, TX (US); Chen Yang, Austin, TX (US); Joe A. Ojeda, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 347 days.

(21) Appl. No.: 16/775,402

(22) Filed: Jan. 29, 2020

(65) Prior Publication Data

US 2020/0240547 A1 Jul. 30, 2020

Related U.S. Application Data

(60) Provisional application No. 62/798,118, filed on Jan. 29, 2019, provisional application No. 62/798,084, filed on Jan. 29, 2019.

(51) Int. Cl.
*F16K 99/00* (2006.01)

(52) U.S. Cl.
CPC ...... *F16K 99/0009* (2013.01); *F16K 99/0036* (2013.01)

(58) Field of Classification Search
CPC .. F16K 99/044; F16K 99/036; F16K 99/0009; F16K 99/0007
See application file for complete search history.

(56) References Cited

U.S. PATENT DOCUMENTS

| | | | | | |
|---|---|---|---|---|---|
| 4,826,131 | A | * | 5/1989 | Mikkor | H01H 50/005 251/368 |
| 4,869,282 | A | * | 9/1989 | Sittier | F16K 99/0015 137/15.01 |
| 5,178,190 | A | * | 1/1993 | Mettner | F15C 5/00 251/129.01 |
| 5,954,079 | A | * | 9/1999 | Barth | F15C 5/00 137/13 |
| 6,116,863 | A | * | 9/2000 | Ahn | F04B 43/043 417/322 |
| 6,494,804 | B1 | * | 12/2002 | Hunnicutt | F15C 5/00 137/625.6 |
| 6,523,560 | B1 | * | 2/2003 | Williams | F16K 99/0044 303/119.2 |

(Continued)

*Primary Examiner* — Umashankar Venkatesan
(74) *Attorney, Agent, or Firm* — MacMillan, Sobanski & Todd, LLC

(57) ABSTRACT

A microvalve includes a first plate having a surface defining an actuator cavity. A second plate has a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve. An actuator is connected to the displaceable member. The displaceable member includes a sealing portion having a plurality of elongated control arms extending inwardly from one end thereof, wherein the control arms are configured as a valve closing members for each of a plurality of fluid flow openings in the first plate.

8 Claims, 9 Drawing Sheets

(56) References Cited

U.S. PATENT DOCUMENTS

| | | | |
|---|---|---|---|
| 6,540,203 B1 | 4/2003 | Hunnicutt | |
| 6,694,998 B1* | 2/2004 | Hunnicutt | F15C 5/00 |
| | | | 137/625.25 |
| 6,845,962 B1 | 1/2005 | Barron et al. | |
| 8,011,388 B2 | 9/2011 | Fuller et al. | |
| 9,328,850 B2* | 5/2016 | Fuller | F16K 99/0055 |
| 2002/0174891 A1* | 11/2002 | Maluf | B81B 3/0024 |
| | | | 137/14 |
| 2005/0133751 A1* | 6/2005 | Seeley | F16K 99/0007 |
| | | | 251/129.06 |
| 2009/0314365 A1* | 12/2009 | McAvoy | F16K 99/0001 |
| | | | 137/637 |
| 2009/0314970 A1* | 12/2009 | McAvoy | F16K 99/0001 |
| | | | 251/4 |
| 2016/0047491 A1* | 2/2016 | Fuller | F16K 99/0028 |
| | | | 137/625.48 |
| 2016/0053916 A1* | 2/2016 | Arunasalam | F16K 99/0044 |
| | | | 137/601.14 |
| 2016/0138733 A1* | 5/2016 | Arunasalam | F16K 99/0011 |
| | | | 251/129.06 |

* cited by examiner

TWO PORT MEMS SILICON FLOW CONTROL VALVE

BACKGROUND OF THE INVENTION

This invention relates in general to a MEMS valve for controlling the flow of fluid through a fluid circuit. In particular, this invention relates to an improved structure for a thermally actuated MEMS valve with multiple fluid ports that is configurable as either a normally open or as a normally closed flow control valve.

Micro Electro Mechanical Systems (MEMS) are a class of systems that are physically small, having features with sizes in the micrometer range; i.e., about 10 µm or smaller. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today, there are many more micromachining techniques and materials available. The term "micromachined device" as used in this application means a device having some features with sizes of about 10 µm or smaller, and thus by definition is at least partially formed by micromachining. More particularly, the term "microvalve" as used in this application means a valve having features with sizes of about 10 µm or smaller, and thus by definition is at least partially formed by micromachining. The term "microvalve device" as used in this application means a micromachined device that includes a microvalve, and that may include other components. It should be noted that if components other than a microvalve are included in the microvalve device, these other components may be micromachined components or standard sized (larger) components. Similarly, a micromachined device may include both micromachined components and standard sized (larger) components.

Various microvalve devices have been proposed for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby substantially preventing fluid from flowing between the fluid ports. When the valve component moves from the closed position to the fully open position, fluid is increasingly allowed to flow between the fluid ports.

U.S. Pat. Nos. 6,523,560, 6,540,203, 6,845,962, and 8,011,388 the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. The movable parts are formed by removing material from an intermediate mechanical layer (by known micromachined device fabrication techniques, such as, but not limited to, Deep Reactive Ion Etching) to create a movable valve element that remains attached to the rest of the part by a spring-like member. Typically, the material is removed by creating a pattern of slots through the material to achieve the desired shape. The movable valve element will then be able to move in one or more directions an amount roughly equal to the slot width.

Despite their utility, conventional microvalves may have undesirable limitations. U.S. Pat. No. 8,011,388, the disclosures of which are incorporated herein by reference, is one example of a high flow/high pressure microvalve with such undesirable limitations. As illustrated therein in FIGS. 25, 25, and 27, the valve 200 has fluid flow ports on both ends of the valve, and is further limited to having fluid flow ports on both ends of the valve 200, i.e. on each end of the ribs. Additionally, the solder area on the outside surface of the valve is located centrally and opposite the ribs. With the fluid flow ports on both ends of the ribs, material thermal expansion mismatches in the ribs may occur and cause actuation of the valve in unpredictable ways. The occurrence of such material thermal expansion mismatches may also induce stress in the solder interface of the valve to a mounting manifold, thus causing solder failure.

It would be desirable however, to provide an improved microvalve that is configurable as either a normally open or as a normally closed flow control valve.

SUMMARY OF THE INVENTION

This invention relates to an improved microvalve that includes a first plate having a surface defining an actuator cavity. A second plate has a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve. An actuator is connected to the displaceable member. The displaceable member includes a sealing portion having a plurality of elongated control arms extending inwardly from one end thereof, wherein the control arms are configured as a valve closing members for each of a plurality of fluid flow openings in the first plate.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
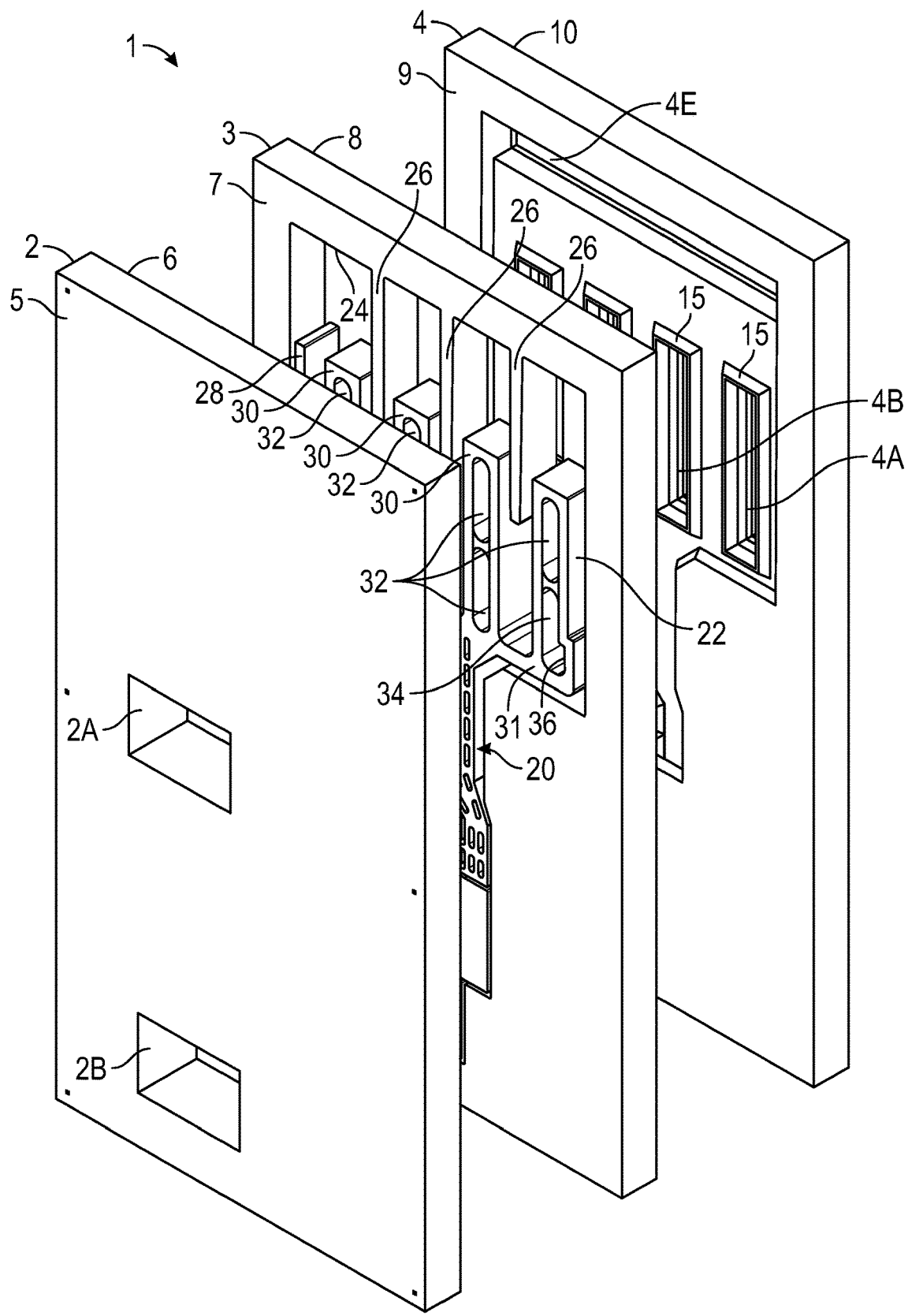
FIG. 1 is an exploded perspective view of a basic structure of a microvalve including a cover plate, an intermediate plate, and a base plate according to the invention.
Figure 2:
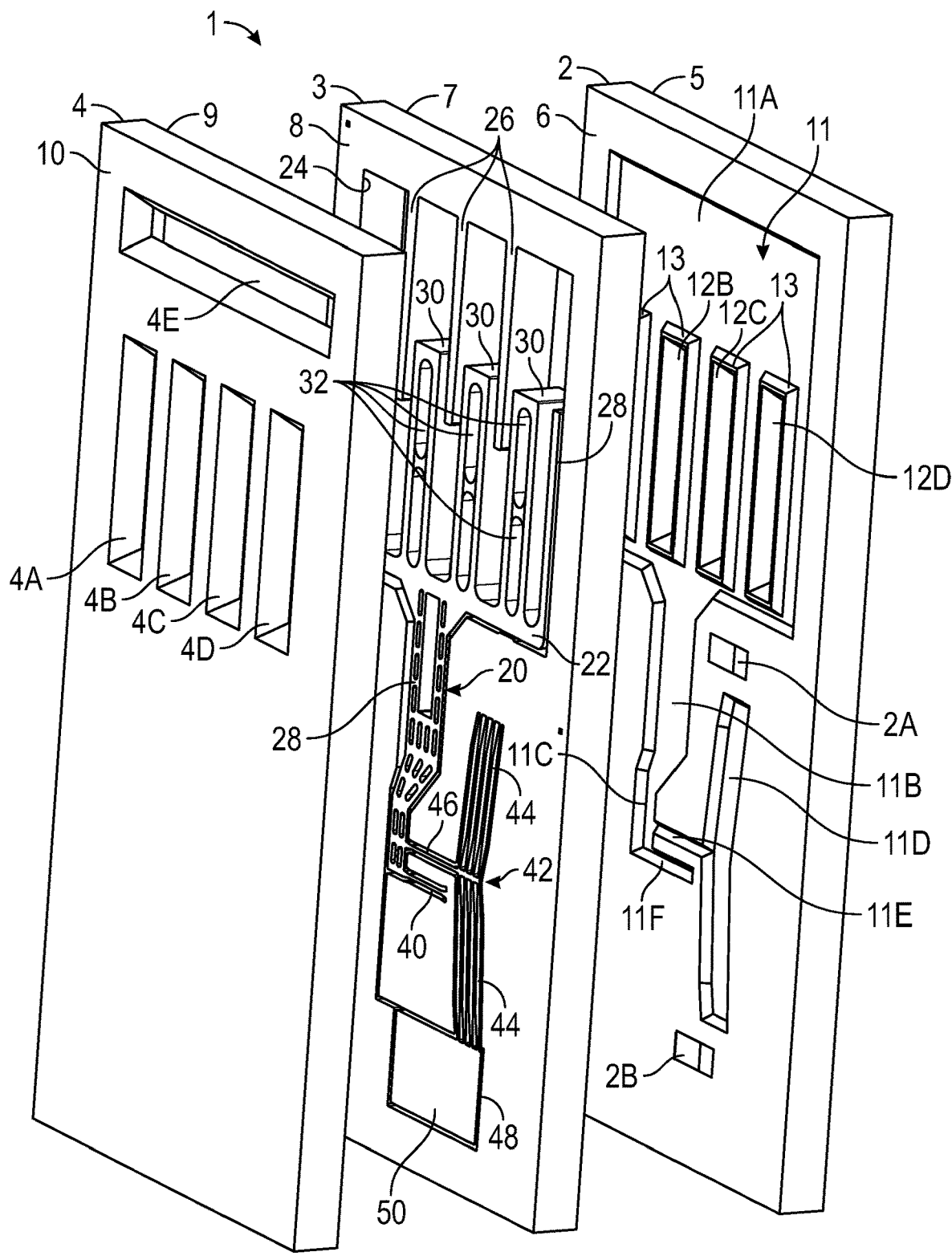
FIG. 2 is an alternate exploded perspective view of the basic structure of the cover plate, an intermediate plate, and a base plate of the microvalve illustrated in FIG. 1.
Figure 5:
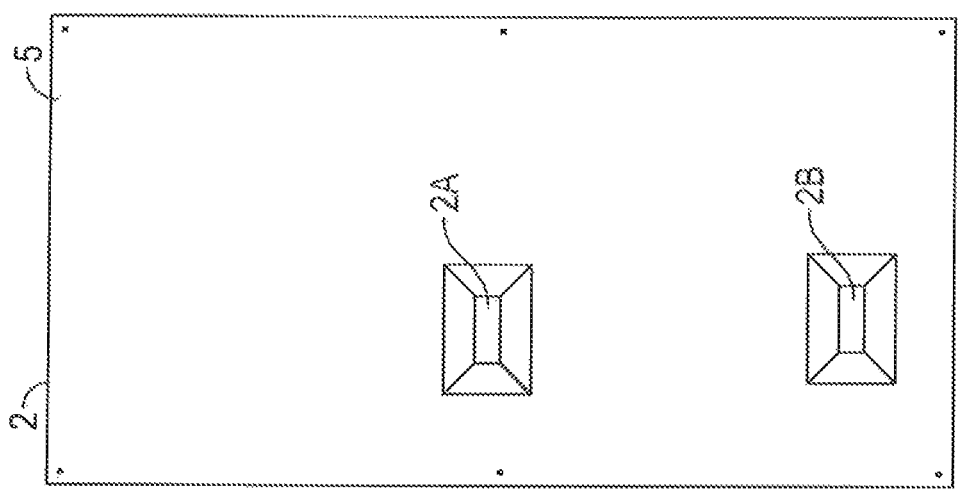
FIG. 5 is a plan view of an outer surface of the cover plate of the microvalve illustrated in FIGS. 1 and 2.

Referring now to the drawings, there is illustrated in FIGS. 1 through 15 an improved structure for a microvalve 1 in accordance with this invention. The illustrated microvalve 1 includes a cover plate 2, an intermediate plate 3, and a base plate 4. The cover plate 2 has an outer surface 5 and an inner surface 6. The cover plate 2 also has one or more openings (two of such openings 2A and 2B are shown in the illustrated embodiment) formed therethrough that, in a manner that is well known in the art, allow one or more electrically conductive wires (not shown) to pass therethrough. The intermediate plate 3 has a first surface 7 and a second surface 8. The base plate 4 has an inner surface 9 and an outer surface 10. The base plate 4 also has a one or more openings formed therethrough that, in a manner that is well known in the art, allow fluid to flow in to and/or out of the microvalve 1. In the illustrated embodiment, the base plate 4 has four of such openings 4A, 4B, 4C, and 4D formed therethrough configured as inlet openings. Additionally, the illustrated embodiment includes one opening 4E configured as an outlet opening.

When the microvalve 1 is assembled in a known manner, the inner surface 6 of the cover plate 2 engages the first surface 7 of the intermediate plate 3, and the inner surface 9 of the base plate 4 engages the second surface 8 of the intermediate plate 3. The cover plate 2, the intermediate plate 3, and the base plate 4 can be retained in this orientation in any desired manner. For example, portions of the cover plate 2 and/or the base plate 4 may be bonded to the intermediate plate 3, such as by fusion bonding, chemical bonding, or physically bonding (such as, for example, mechanical fasteners and/or adhesives). The cover plate 2, the intermediate plate 3, and the base plate 4 may be composed of any desired material or combination of materials. For example, the cover plate 2, the intermediate plate 3, and the base plate 4 may be composed of silicon and/or similar materials.

Figure 8:
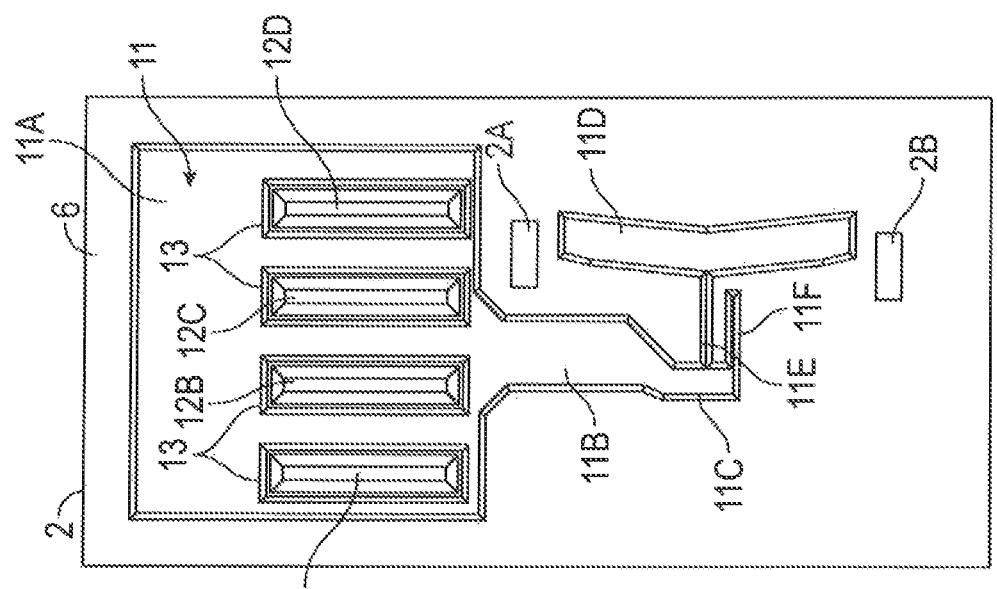
FIG. 8 is a plan view of an inner surface of the cover plate illustrated in FIGS. 1, 2, and 5.

The structure of the inner surface 6 of the cover plate 2 is illustrated in detail in FIG. 8. As shown therein, the cover plate 2 includes an actuator cavity, indicated generally at 11, that is provided on the inner surface 6 thereof. The illustrated actuator cavity 11 includes an upper actuator arm cavity portion 11A, a central actuator arm cavity portion 11B, a lower actuator arm cavity portion 11C, an actuator rib cavity portion 11D, an actuator spine cavity portion 11E, and an actuator hinge cavity portion 11F. The upper actuator arm cavity portion 11A has a four recessed areas 12A, 12B, 12C, and 12D provided therein.

As shown in FIG. 8, sealing structures 13 are formed in the inner surface 6 around each of the recessed areas 12A, 12B, 12C, and 12D. The sealing structures 13 extend from the bottom surface of the actuator cavity 11 and completely about the perimeter of the recessed areas 12A, 12B, 12C, and 12D. In the illustrated embodiment, each of the sealing structures 13 is a wall that is generally trapezoidal in cross-sectional shape and includes four linearly-extending wall segments that extend adjacent to the four sides of the recessed areas 12A, 12B, 12C, and 12D. However, the sealing structures 13 may be formed having any desired cross-sectional shape or combination of shapes, and may further extend in any desired manner (linearly or otherwise) about the recessed areas 12A, 12B, 12C, and 12D. For example, the sealing structures 13 may be formed substantially as shown in FIGS. 8 and 13 through 15, but may have rounded corners between adjacent linearly-extending wall segments, have one or more non-linearly-extending wall segments, or be entirely non-linear in shape.

Figure 4:
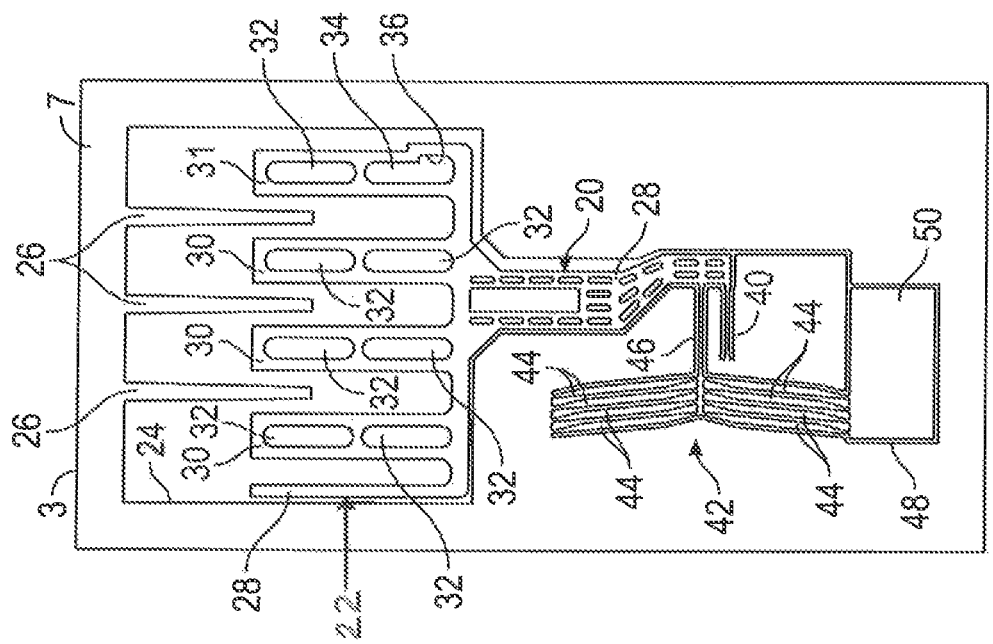
FIG. 4 is a plan view of a first surface of the intermediate plate of the microvalve illustrated in FIGS. 1 and 2.
Figure 7:
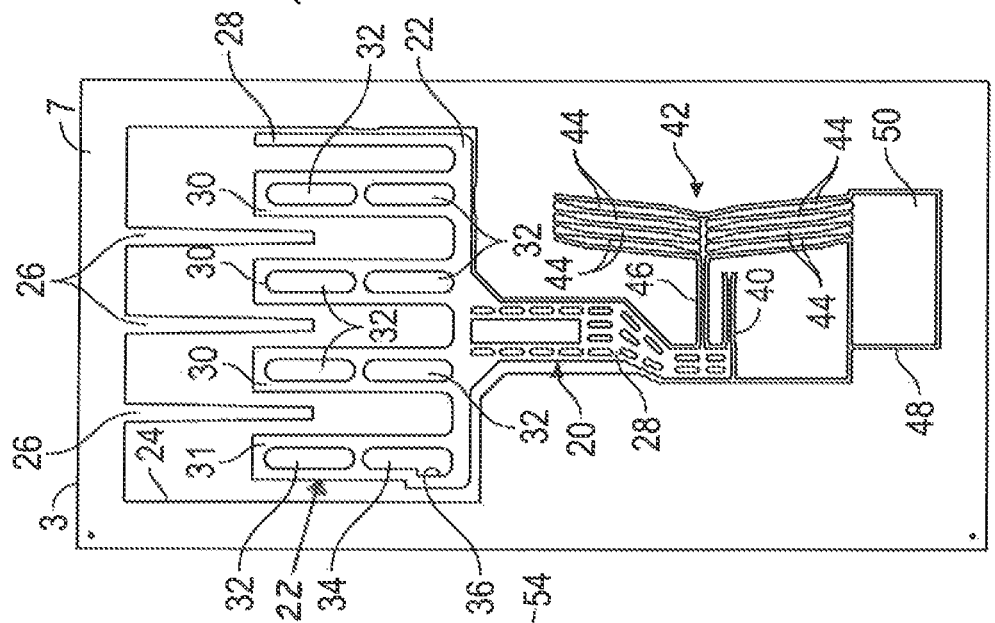
FIG. 7 is a plan view of a second surface of the intermediate plate illustrated in FIGS. 1, 2, and 4.

The structure of the intermediate plate 3 is illustrated in detail in FIGS. 4 and 7. As shown therein, the intermediate plate 3 includes a displaceable member, indicated generally at 20, that includes a sealing portion 22 within a generally rectangular opening 24 having three elongated balance diverters 26 extending inwardly from a first end of the opening 24 (the upper end of the opening 24 when viewing FIGS. 4 and 7). The sealing portion 22 has a first end (the upper end when viewing FIGS. 4 and 7) and a second end (the lower end when viewing FIGS. 4 and 7), and includes an elongated balance arm 28 and four elongated control arms 30, 31 extending inwardly from the second end of the sealing portion. Each control arm 30, 31 is configured as a valve closing member for each of the inlet openings 4A, 4B, 4C, and 4D. Each of three of the control arms 30 includes a pair of openings 32 formed therethrough. The fourth control arm 31 (the right-most control arm 30 when viewing FIG. 4 includes one of the openings 32 and one opening 34 (opening 34 is at the lower end of the control arms 31 when viewing FIG. 4). The opening 34 further includes a balance notch 36 formed therein (the balance notch 36 is formed at the lower end of the opening 34 when viewing FIG. 4). The balance diverters 26 further extend between adjacent ones of the control arms 30, 31.

The sealing portion 22 is connected through an elongated arm portion 38 to a hinge portion 40 that is formed integrally with the intermediate plate 3. The intermediate plate 3 also includes an actuator 42 including a plurality of actuator ribs 44. The actuator 42 is connected through a central spine 46 to the elongated arm portion 38 at a location that is intermediate of the sealing portion 22 and the hinge portion 40.

An alternative embodiment of the sealing portion is illustrated at 22' in FIGS. 10 through 15. The sealing portion 22' includes the plurality of the control arms 30' and 31'. Each control arm 30' includes one elongated and rectangular opening 32'. The control arm 31' includes one elongated and generally rectangular opening 34' having the balance notch 36' formed therein (the balance notch 36' is formed at the lower end of the opening 34' when viewing FIGS. 10 through 15).

As shown in FIGS. 4 and 7, first ends of a first portion of the plurality of actuator ribs 44 (the upper ribs 44 when viewing FIGS. 4 and 7) are flexibly joined at first ends thereof to a first non-moving part of the intermediate plate 3. Second ends of the first portion of the plurality of actuator ribs 44 are connected to the central spine 46. The first non-moving part of the intermediate plate 3 is electrically connected to a first bond pad (not shown) that is provided on the intermediate plate 3. Similarly, first ends of a second portion of the plurality of actuator ribs 44 (the lower ribs 44 when viewing FIGS. 4 and 7) are flexibly joined at first ends thereof to a second non-moving part of the intermediate plate 3. Second ends of the second portion of the plurality of actuator ribs 44 are also connected to the central spine 46. The second non-moving part of the intermediate plate 3 is electrically connected to a second bond pad (not shown) that is provided on the intermediate plate 3. The second bond pad is electrically isolated from the first bond pad, other than through the plurality of actuator ribs 44.

The intermediate plate 3 may also include one or more channels, such as the channel 48, formed through the intermediate plate 3. The channel 48 is formed through the intermediate plate 3 to define a generally rectangular isolation region 50 at first ends of the second portion of the actuator ribs 44, physically separating the isolation region 50 from all the rest of the intermediate plate, except for through the plurality of actuator ribs 44. As discussed above, the cover plate 2 and the base plate 4 are electrically non-conductive. The second bond pad (not shown, but formed within the isolation region 50) is thus electrically isolated from the first bond pad (not shown), other than through the plurality of actuator ribs 44.

In a manner that is well known in the art, electrical current may be passed from the first bond pad through the plurality of actuator ribs 44 to the second bond pad. Such electrical current causes thermal expansion of the plurality of actuator ribs 44, which causes axial movement of the central spine 46. As described above, the central spine 46 is connected to the elongated arm portion 38. Consequently, axial movement of the central spine 46 causes the elongated arm portion 38 (and, therefore, the sealing portion 22) of the displaceable member 20 to pivot about the hinge portion 40 or otherwise move relative to the rest of the intermediate plate 3 (such movement occurring within a plane defined by the rest of the intermediate plate 3). Thus, the illustrated displaceable member 20 functions similarly to a conventional micro-electro-mechanical system thermal actuator.

Figure 3:
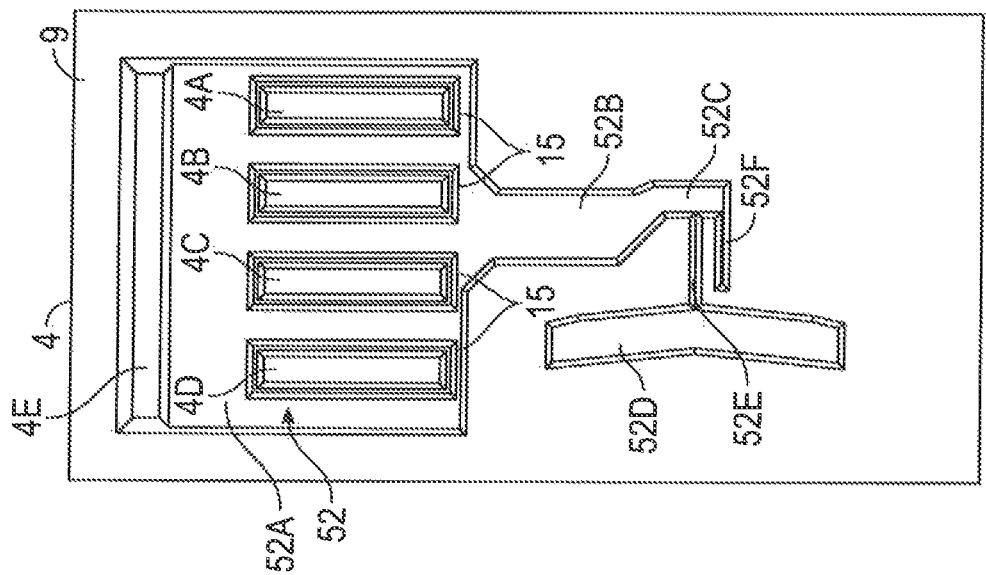
FIG. 3 is a plan view of an inner surface of the base plate of the microvalve illustrated in FIGS. 1 and 2.

The structure of the inner surface 9 of the base plate 4 is illustrated in detail in FIG. 3. As shown therein, the base plate 4 includes an actuator cavity, indicated generally at 52, that is provided on the inner surface 9 thereof. The illustrated actuator cavity 52 includes an upper actuator arm cavity portion 52A, a central actuator arm cavity portion 52B, a lower actuator arm cavity portion 52C, an actuator rib cavity portion 52D, an actuator spine cavity portion 52E, and a hinge cavity portion 52F.

Figure 6:
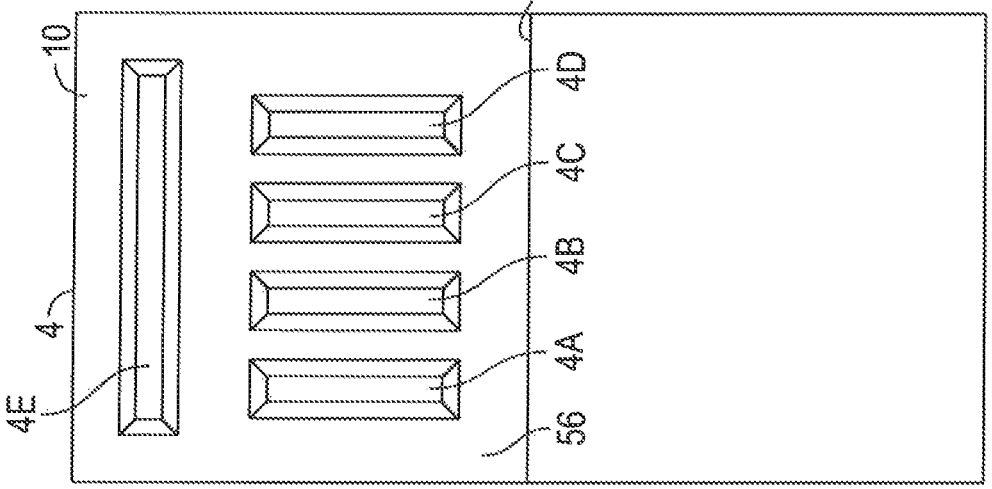
FIG. 6 is a plan view of an outer surface of the base plate of the microvalve illustrated in FIGS. 1, 2, and 3.

Sealing structures 15 are also formed in the inner surface 9 around each of the openings 4A, 4B, 4C, and 4D. The sealing structures 15 are otherwise the same as the sealing structures 13 and will not be described further herein. As shown in FIG. 6, the outer surface 10 of the base plate 4 includes a solder area 56 above the ribs 44 (above the line 54 when viewing FIG. 6).

Figure 9:
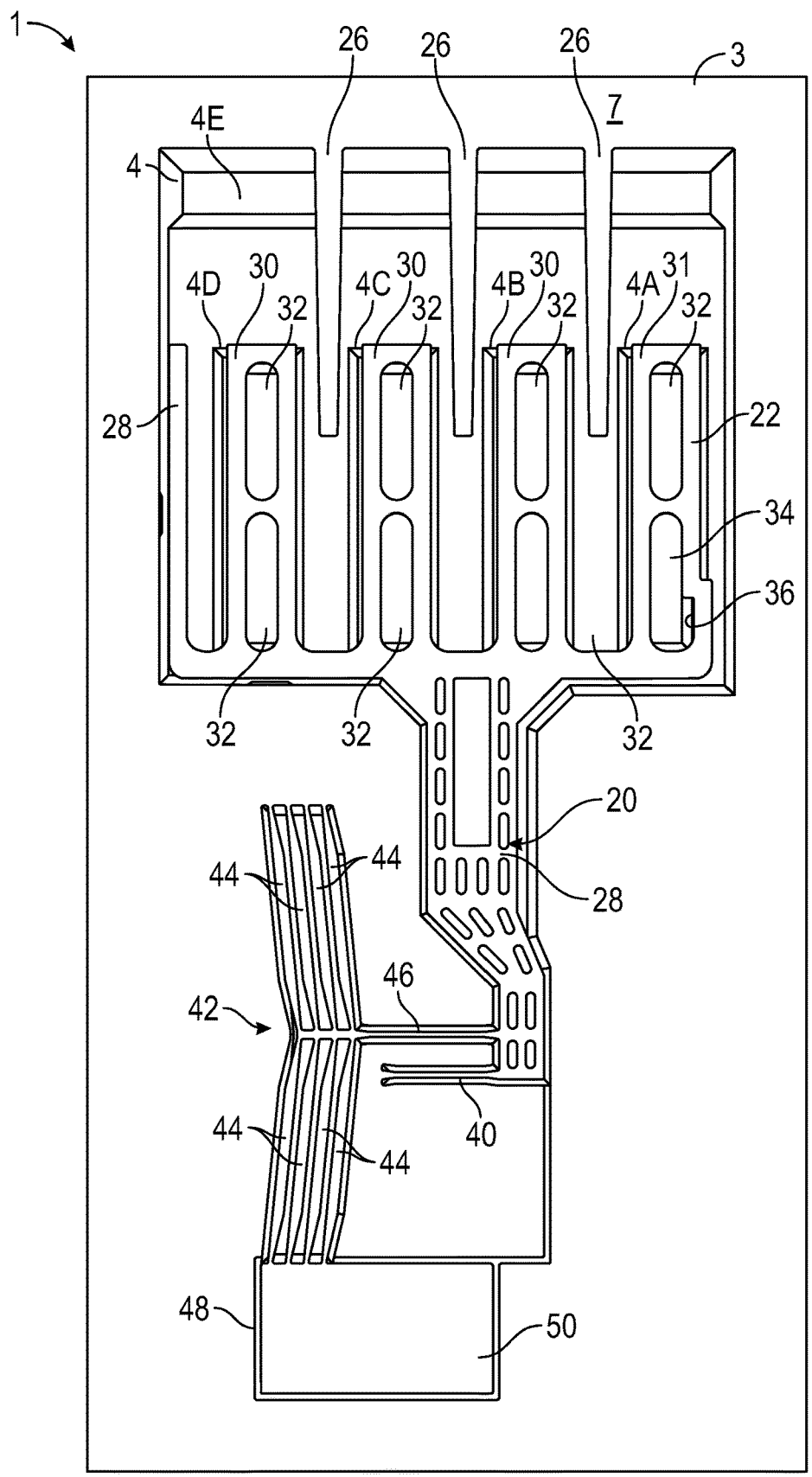
FIG. 9 is a plan view of the intermediate plate mounted on the base plate showing the microvalve configured as a normally closed valve.
Figure 10:
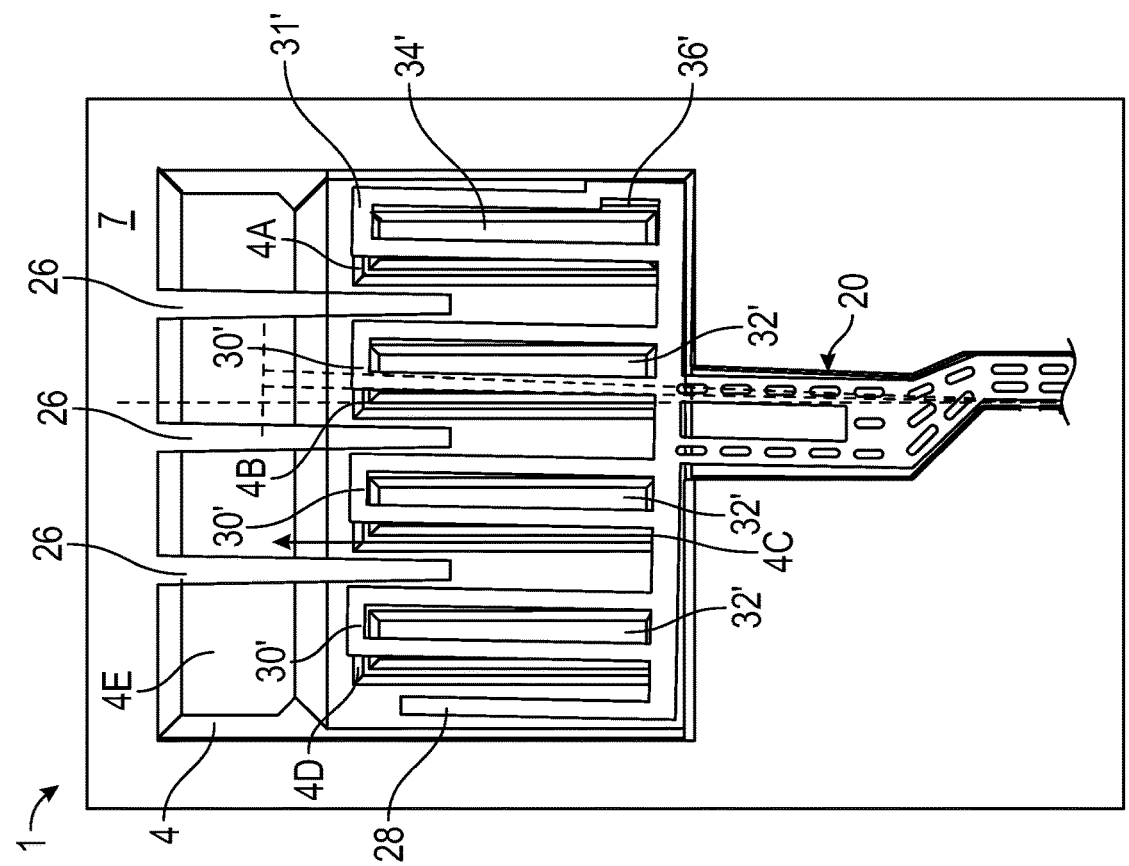
FIG. 10 is a plan view of a portion of the intermediate plate and the base plate illustrated in FIG. 9 showing the normally closed microvalve in a half-open position.
Figure 11:
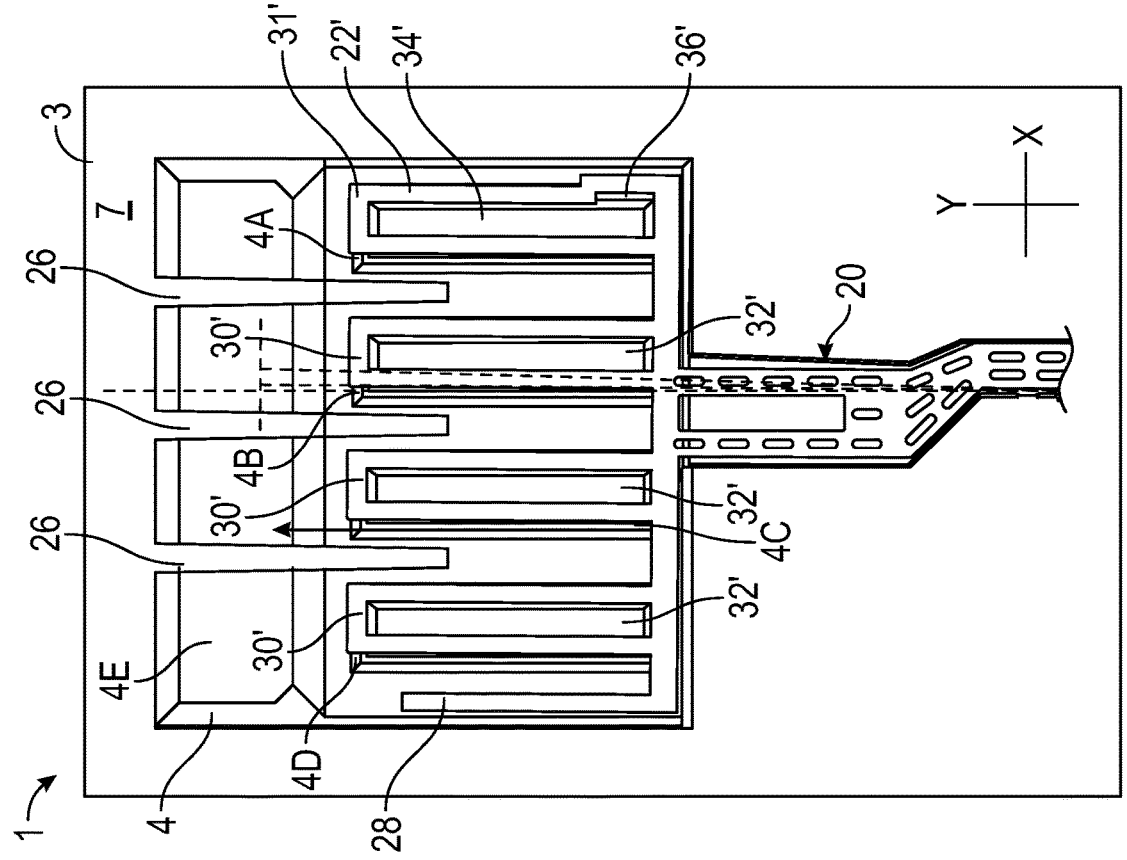
FIG. 11 is a plan view of the portion of the intermediate plate and the base plate illustrated in FIG. 10 showing the normally closed microvalve in a full-open position.
Figure 12:
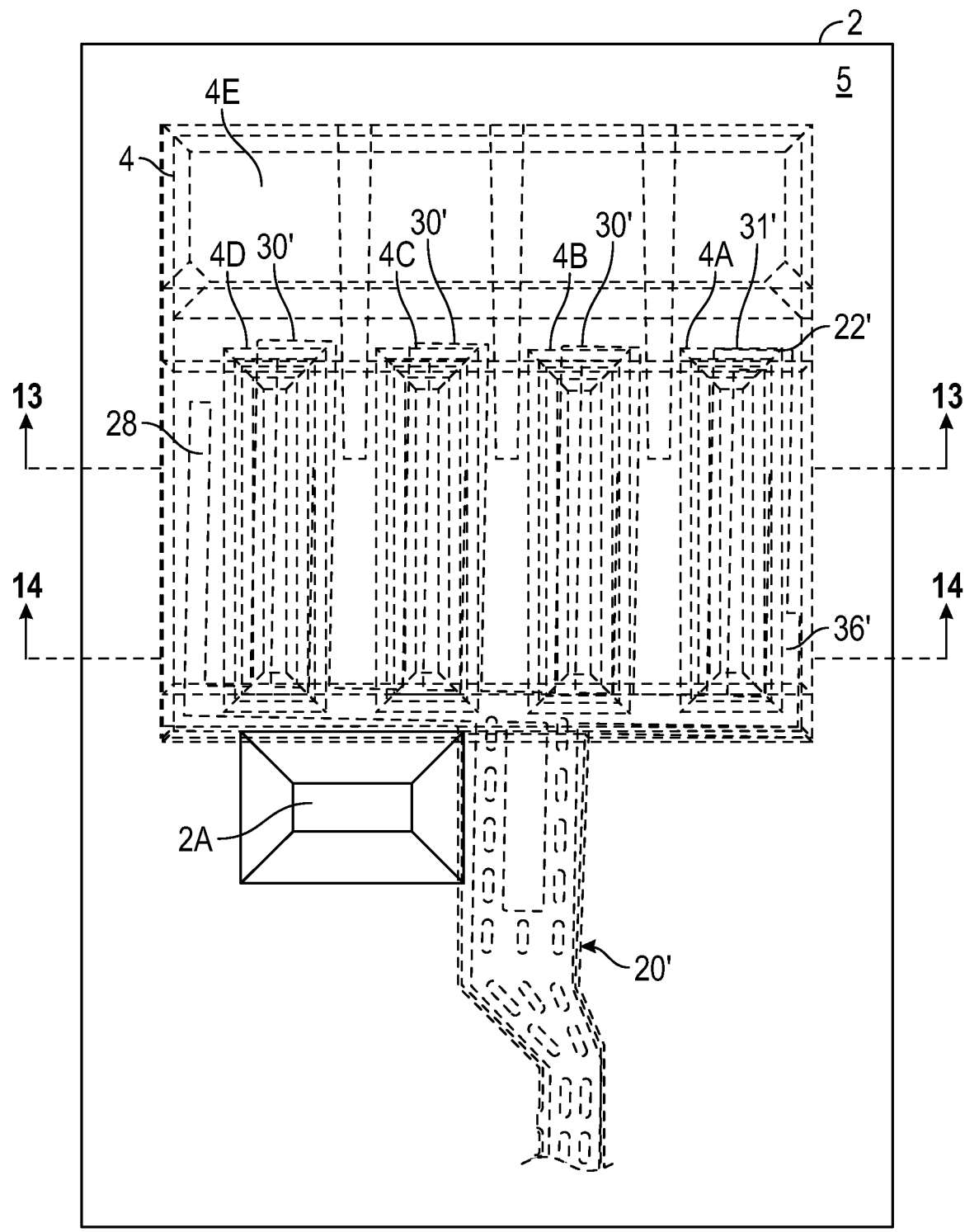
FIG. 12 is a plan view of a portion of the microvalve illustrated in FIGS. 1 and 2 shown assembled and in a full-open position.
Figure 13:
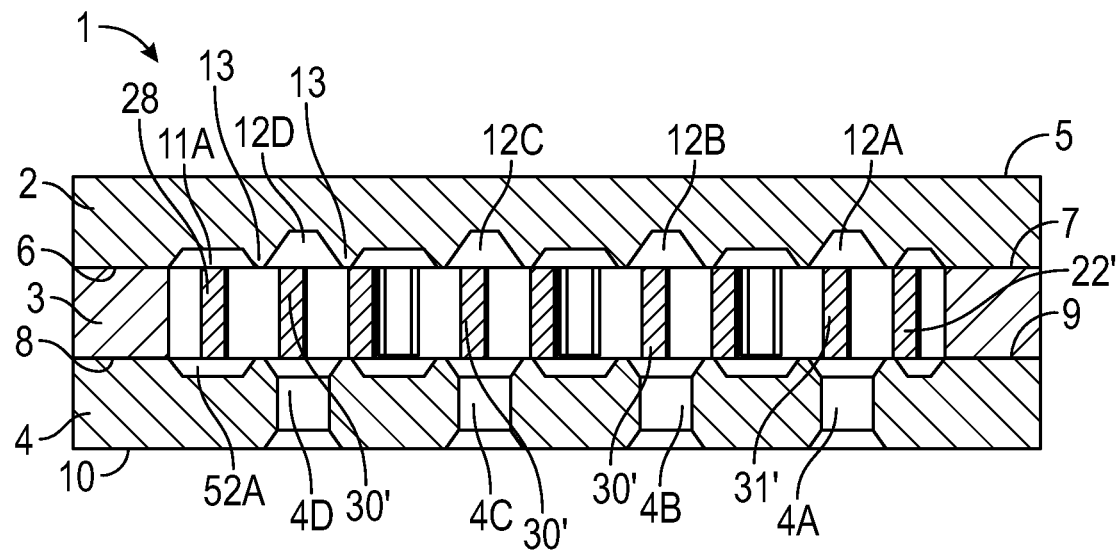
FIG. 13 is a cross-sectional view taken along line 13-13 of FIG. 12.
Figure 14:
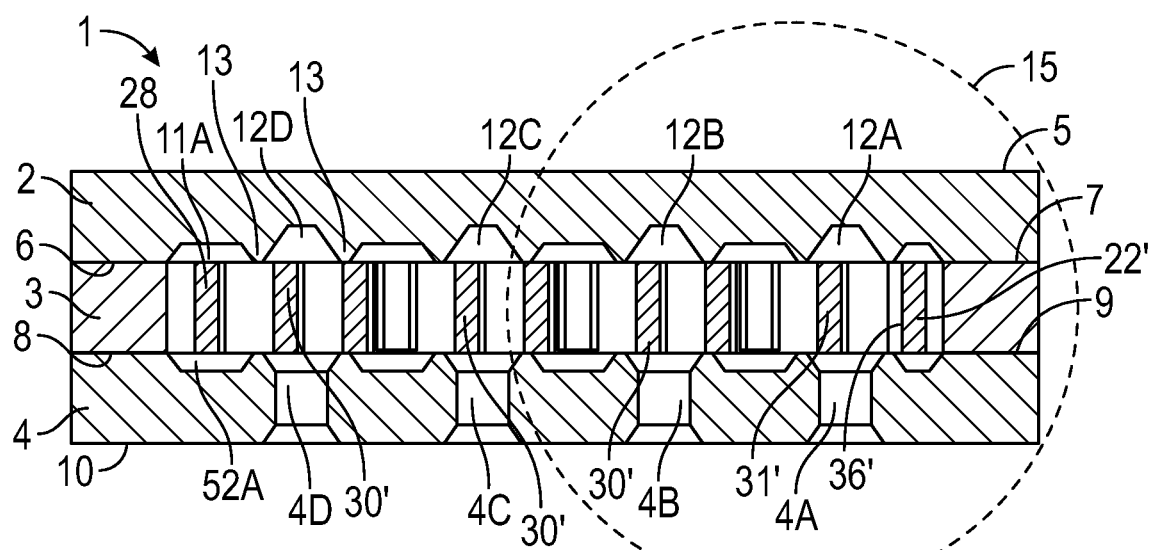
FIG. 14 is a cross-sectional view taken along line 14-14 of FIG. 12.
Figure 15:
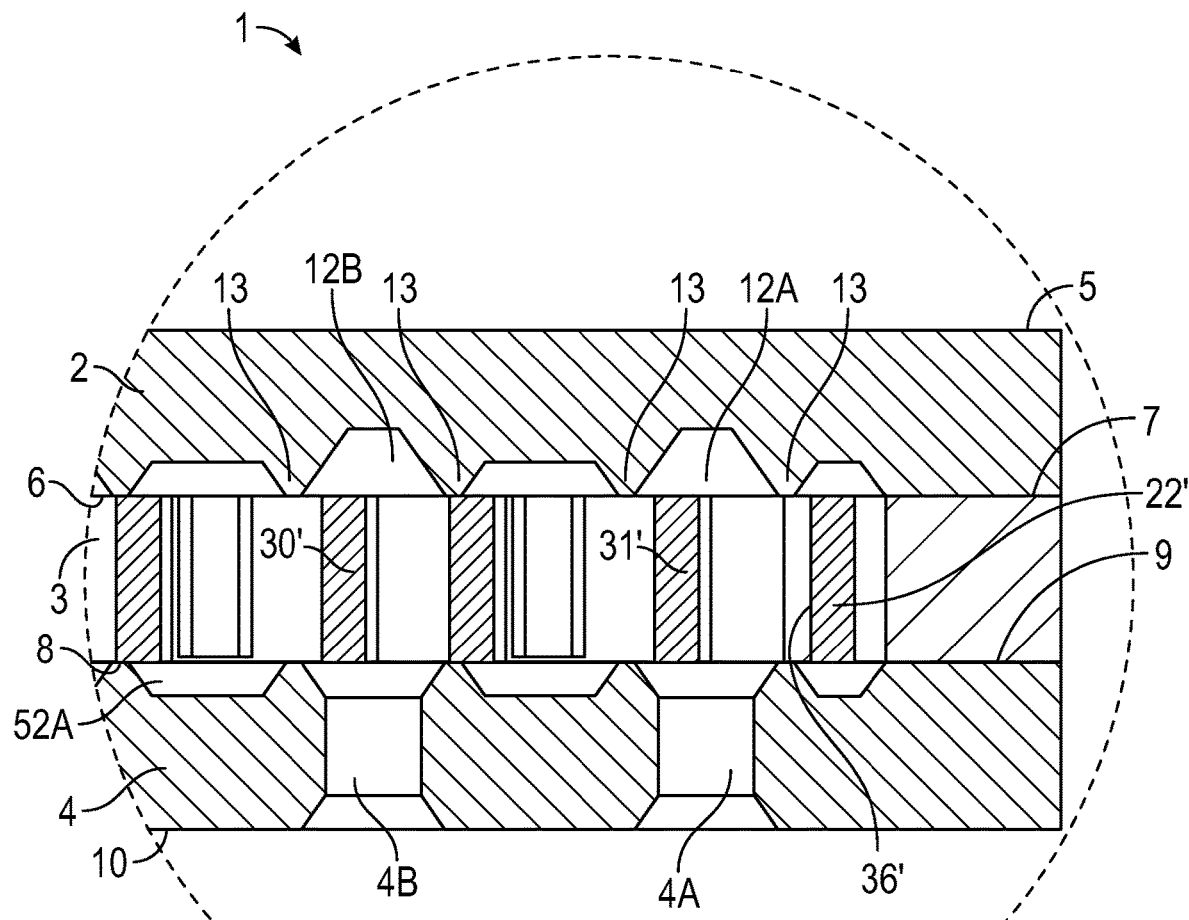
FIG. 15 is an enlarged view of a portion of the microvalve illustrated in FIG. 14.

The illustrated microvalve 1 is configured as a normally closed valve. During actuation or energization of the microvalve 1, the plurality of ribs 44 are heated by passing an electrical current therethrough. The plurality of ribs 44 then undergo thermal expansion and elongate, which urges the moveable central spine 46 toward the displaceable elongated arm portion 38 which is operatively coupled thereto. The displaceable elongated arm portion 38 then bends or flexes at the hinge portion 40 to accommodate movement of the moveable central spine 46 thereby causing the sealing portion 22 to move along a path of arcuate motion to a stressed position which unblocks the normally closed inlet fluid ports 4A, 4B, 4C, and 4D. As a result, when actuator 42 is in an actuated, energized, and stressed position during operation of the assembled microvalve 1, fluid communication between the inlet fluid ports 4A, 4B, 4C, and 4D and the outlet fluid port 4E is allowed, as shown in FIG. 11, which illustrates the microvalve 1 in a full open position. It will be understood that FIG. 9 illustrates the microvalve 1 in a closed position, and FIG. 10 illustrates the microvalve 1 in a half-open position.

During unactuation or deenergization, the plurality of ribs 44 are cooled by not passing an electrical current therethrough. The plurality of ribs 44 then undergo thermal shrinkage and contract, which urges the moveable central spine 46 away from the displaceable elongated arm portion 38 which is operatively coupled thereto. The displaceable elongated arm portion 38 then straightens at the hinge portion 40 to accommodate movement of the moveable central spine 46 thereby causing the sealing portion 22 to move back along a path of arcuate motion to return to a relaxed position which blocks the normally closed inlet fluid ports 4A, 4B, 4C, and 4D, as illustrated in FIG. 9.

The illustrated microvalve 1 has all fluid ports 4A, 4B, 4C, 4D, and 4E on one side, i.e., the bottom or surface 10. Alternatively, the microvalve 1 may also be formed with fluid ports on two sides (the surfaces 10 and 5), thus providing flexibility in the package design. For example, the inlet fluid ports 4A, 4B, 4C, and 4D may be on the bottom (the surface 10) and the outlet fluid port 4E may be on the top (the surface 5).

Advantageously, fluid flow through the microvalve 1 is improved relative to similar, known microvalves, such as the microvalve described in U.S. Pat. No. 8,011,388, described above. A number of structural features of the valve 1 combine to provide the microvalve 1 with improved, balanced fluid flow. In the microvalve 1, all the fluid ports, 4A through 4E are located at one end of the actuator ribs 44. Additionally, the sealing portion 22 of the displaceable member 20 includes the balance arm 28, the control arms 30, and the balance notch 36 in the fourth control arm 31. Further, the opening 24 includes the elongated balance diverters 26.

The balance diverters 26 are configured to balance the flow forces in the microvalve 1 during operation. However, as the control arms 30, 31 are moved from the closed position to the full-open position, the balance of the flow forces can change in a manner that negatively affects the flow of fluid through the microvalve 1. The balance arm 28 and the balance notch 36 are specifically configured to fine tune the balance of the flow forces across the range of movement of the control arms 30, 31 from the closed position to the full-open position, and across a range of pressure differential across the microvalve 1, such as pressure differential up to about 3.5 Mpa. This fine tuning of the balance of flow forces accomplished by changing the direction of fluid flow.

It is desirable in a microvalve that the sum of the forces from all the surfaces involved in fluid flow be a very slightly negative force, such as a force of less than or equal to about 0.6 Newtons in the x direction (see for example FIG. 10). It has been shown that a conventional microvalve without the improved features described herein, experiences flow forces an order of magnitude higher than those experienced in the improved microvalve 1, such as, for example greater than about 2 Newtons.

The features of the illustrated microvalve 1 may be changed depending on the application and the environment in which the microvalve 1 will operate. For example, the balance diverters 26 may be adjusted for number, length, width, and spacing. The balance arm 28 may be adjusted for length, width, and spacing. The balance notch 36 may also be adjusted to open part way through the stroke of the sealing portion 22 of the displaceable member 20 to allow fluid flow, which develops a pressure force, around the right side (when viewing FIGS. 10 and 11) of the control arm 31. It has been shown that without the notch 36 the sum of the forces would be in the positive x direction, i.e., the sum of the forces would operate to urge the microvalve 1 open. Additionally, and as a further disadvantage, a force in the positive x direction when the microvalve is in the full-open position would prevent the microvalve 1 from closing.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A microvalve comprising:
    a first plate including a surface having an actuator cavity provided therein;
    a second plate having a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve; and
    an actuator connected to the displaceable member;
    wherein the displaceable member includes a sealing portion having a plurality of elongated control arms extending into an opening in the second plate, the control arms configured as a valve closing members for each of a plurality of fluid flow openings in the first plate;
    wherein each of the control arms has an opening formed therethrough;
    wherein an outboard one of the control arms includes a balance notch formed in the opening formed therethrough;
    wherein an elongated balance arm adjacent an outboard one of the control arms opposite the control arm having the balance notch formed therein;
    wherein the opening in the second plate has a plurality of elongated balance diverters extending inwardly from a first end of the opening into a space between adjacent ones of the control arms; and
    wherein the balance arm and the balance notch are configured to fine tune the balance of the flow forces across the range of movement of the control arms from the closed position to the opened position, and across a range of pressure differential across the microvalve.

2. The microvalve according to claim 1, wherein three of the control arms are first control arms and one of the control arms is a second control arm.

3. The microvalve according to claim 2, wherein the first control arms have two openings formed therethrough, and wherein the second control arm has two opening formed therethrough, one of which includes the balance notch.

4. The microvalve according to claim 2, wherein the first control arms have one opening formed therethrough, and wherein the second control arm has one opening formed therethrough, the one opening in the second control arm including the balance notch.

5. A microvalve comprising:
    a first plate including a surface having a first actuator cavity provided therein;
    a second plate having a first surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve;
    a third plate including a surface having a second actuator cavity provided therein; wherein the second plate has a second surface that abuts the surface of the third plate; and
    an actuator connected to the displaceable member;
    wherein the displaceable member includes a sealing portion having a plurality of elongated control arms extending into an opening in the second plate, the control arms configured as a valve closing members for each of a plurality of fluid flow openings in the first plate
    wherein each of the control arms has an opening formed therethrough;
    wherein an outboard one of the control arms includes a balance notch formed in the opening formed therethrough;
    wherein an elongated balance arm adjacent an outboard one of the control arms opposite the control arm having the balance notch formed therein;
    wherein the opening in the second plate has a plurality of elongated balance diverters extending inwardly from a first end of the opening into a space between adjacent ones of the control arms; and
    wherein the balance arm and the balance notch are configured to fine tune the balance of the flow forces across the range of movement of the control arms from the closed position to the opened position, and across a range of pressure differential across the microvalve.

6. The microvalve according to claim 5, wherein three of the control arms are first control arms and one of the control arms is a second control arm.

7. The microvalve according to claim 6, wherein the first control arms have two openings formed therethrough, and wherein the second control arm has two opening formed therethrough, one of which includes the balance notch.

8. The microvalve according to claim 6, wherein the first control arms have one opening formed therethrough, and wherein the second control arm has one opening formed therethrough, the one opening in the second control arm including the balance notch.

* * * * *